United States Patent
Jones

[15] 3,643,409
[45] Feb. 22, 1972

[54] MOWER BLADE

[72] Inventor: William Archibald Jones, Fonthill, Ontario, Canada

[73] Assignee: Deere & Company, Moline, Ill.

[22] Filed: Nov. 5, 1970

[21] Appl. No.: 87,188

[52] U.S. Cl. .................................................................56/295
[51] Int. Cl. .......................................................A01d 55/18
[58] Field of Search ...........................................56/295, 503

[56] References Cited

UNITED STATES PATENTS 2,592,755  4/1952  Soenksen................................56/295

FOREIGN PATENTS OR APPLICATIONS 231,016  3/1959  Australia................................56/295
248,800  10/1963  Australia................................56/295

*Primary Examiner*—Robert Peshock
*Attorney*—H. Vincent Harsha, Harold M. Knoth, William A. Murray, Raymond L. Hollister and John M. Nolan

[57] ABSTRACT

A mower blade assembly for use in a rotary mower having a vertical, power-driven shaft, the assembly consisting of an elongated blade carrier rigidly secured at its midpoint to the vertical shaft for rotation therewith, and a pair of vertically offset cutting blades swingably mounted on opposite ends of the carrier. The cutting blades are swingable about axes sloping downwardly, radially inwardly, and tangentially rearwardly relative to the direction of rotation of the carrier, whereby the outer ends of the blades move upwardly to provide increased ground clearance as they are swung from an operative, radially outwardly extending position, to an inoperative, tangentially rearwardly extending position.

6 Claims, 4 Drawing Figures

INVENTOR.
WILLIAM A. JONES 3,643,409

MOWER BLADE

BACKGROUND OF THE INVENTION

The present invention relates generally to mowers, and more particularly to a mower blade assembly for use in a mower of the vertical shaft, rotary type.

Since the cutting action of a rotary mower results solely from the impact between the cutting edge of the blade and the material being mowed, it is necessary that the blade be operated at an extremely high rotational velocity to achieve an acceptable cutting job. Although necessary from an operational standpoint, such high rotational velocity, and resulting blade tip speed and momentum, is the cause of several serious and well-recognized problems. One such problem, encountered primarily in relatively large, heavy-duty, agricultural mowers, is that of damage resulting to the mower drive train when a large foreign object, such as a stump or rock, is accidentally struck by the high-speed blade.

In an effort to reduce these problems, mower blades have been devised which utilize a plurality of small cutting blades pivotally mounted on the radial outer ends of a central blade carrier, the blades thus being free to swing rearwardly upon hitting an obstruction. Since a large portion of the mower blade energy is absorbed as the cutting blades swing rearwardly, less shock is transmitted to the mower drive train and less momentum is imparted to loose objects discharged outwardly by the blade. Although effective to reduce these problems, such mower blades do not represent their final solution. A principal shortcoming of such blade designs arises from the fact that, although the radial clearance between the blade and the object is increased by the initial impact, as the mower is advanced forwardly toward the object it will be repeatedly struck by the blades and the rigid blade carrier on succeeding revolutions.

SUMMARY OF THE INVENTION

It is, accordingly, the primary object of the present invention to provide a rotary mower blade assembly which will substantially reduce the aforesaid problems, and more particularly, such as assembly having a plurality of cutting blades mounted on a blade carrier to swing rearwardly and also upwardly upon striking an obstruction, thereby increasing the vertical clearance as well as the radial clearance between the object and the blade. It is a further object to provide such a blade assembly wherein the blade carrier is mounted in close proximity to the underneath surface of the mower housing and the outer ends of the swingable blades are offset vertically downwardly therefrom, and wherein the outer end of the blade swings upwardly to the approximate level of the carrier upon striking a stationary object. It is a further object to provide such a mower blade assembly in which the cutting blades are free to swing 360° relative to the blade carrier.

It is another primary object of the invention to provide such a mower blade assembly which is effective to force loose objects upwardly into the mower housing where their trajectory will be smothered by the housing. It is yet a further object to provide such a blade assembly in which the swingable cutting blades, when swung rearwardly, present downwardly and rearwardly inclined leading surfaces to assist the blade assembly in passing over immovable obstructions. It is yet a further object to provide such a mower in which the cutting surfaces are inclined so as to create a vertical suction on the material being mowed.

In accordance with these and other objects, the mower blade assembly of the present invention comprises an elongated blade carrier adapted at its center for rigid attachment to the vertical power-driven shaft of the mower, and a pair of vertically offset cutting blades swingably mounted on the opposite outer ends thereof. The outer ends of the carrier are sloped downwardly, radially outwardly, and tangentially forwardly relative to the direction of travel thereof, and the cutting blades are mounted on axes perpendicular thereto. In normal operation, the downwardly offset free end of the blade is maintained radially outwardly of the carrier by centrifugal force, and, upon striking an immovable object, the blade pivots rearwardly and upwardly relative to the carrier, the free end assuming a position behind and at approximately the same level as the outer end of the carrier. In its rearward or inoperative position, the blade presents a downwardly and rearwardly inclined leading surface extending between its inner and outer ends to deflect the blade over tall obstructions. The outer end of the blade, mounted parallel with the outer end of the carrier, is effective in the operational position to deflect objects inwardly into the housing rather than horizontally beneath the latter. The upward slope of the blade is additionally effective to create a suction beneath the housing which acts to lift the material being mowed into the blade.

BRIEF DESCRIPTION OF THE DRAWINGS

The preferred embodiment of the present invention will be described in conjunction with the accompanying drawings in which.

DESCRIPTION OF THE PREFERRED EMBODIMENT

In the ensuing description, right- and left-hand reference is determined by standing at the rear of the mower and facing the direction of travel.

Figure 1:
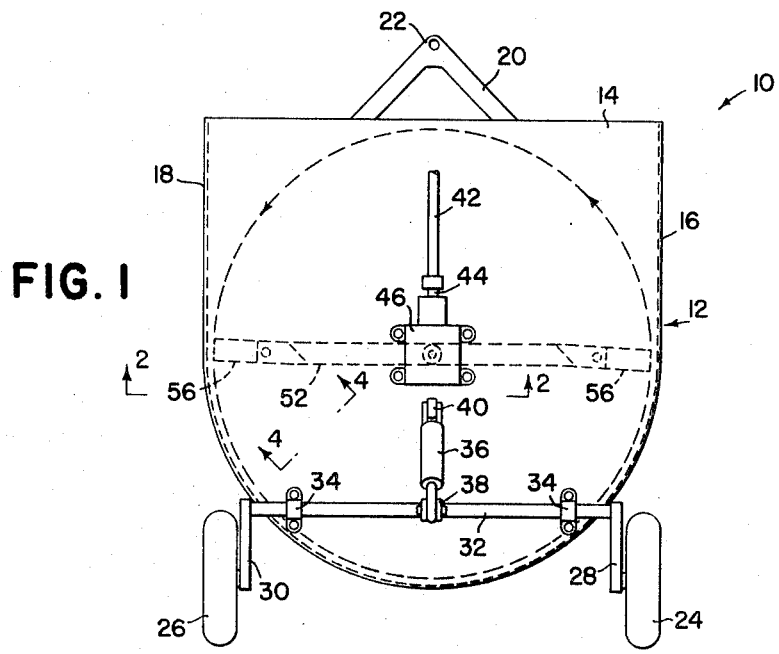
FIG. 1 is a plan view of a rotary mower incorporating the mower blade assembly of the present invention.

Referring first to FIG. 1, the blade assembly of the present invention is illustrated in a heavy-duty mower 10 of the type commonly used for mowing large weeds and underbrush, shredding corn stalks, etc. It will be readily apparent to those versed in the mower art, however, that the blade assembly is equally useful in mowers designed for lighter duty applications, such as mowing lawns. The mower 10 includes a generally horizontal D-shaped frame or housing 12 comprising a flat sheet metal cover 14, and right and left, vertically extending side members or shields 16 and 18, respectively. A forwardly converging V-shaped hitch structure 20 is rigidly fixed to the transverse leading edge of the housing 12 and is provided at its forward end with a clevis 22 for attachment to the drawbar of a tractor. The rear of the housing 12 is supported relative to the ground by a pair of right and left ground-engaging wheels 24 and 26, respectively, the wheels being rotatably carried on the ends of right and left, fore-and-aft extending arms 28 and 30 which, in turn, are fixed to the respective ends of the transverse rockshaft 32. A pair of U-shaped bearing members 34 rockably support the shaft 32 along the rear edge of the housing 12. A conventional hydraulic cylinder 36, coupled to the tractor hydraulic system and acting between an arm 38 fixed to the shaft 32 and a bracket 40 fixed to the top surface of the cover 14, is operable to rock the shaft 32 in the bearings 34 and thereby raise and lower the mower 10 relative to the ground.

The mower is driven from a tractor power takeoff shaft (not shown) through a fore-and-aft shaft 42 interconnecting the power takeoff shaft with the input shaft 44 of a right-angle gearbox 46 mounted centrally on the cover 14 of the mower housing. The vertical output shaft 48 of the gearbox 46 extends downwardly through an aperture in the cover 14 for receiving the mower blade assembly of the invention, indicated in its entirety by the numeral 50. The assembly 50 is illustrated best in FIGS. 2 and 3, and consists generally of an elongated bar or rigid blade carrier 52 nonrotatably fastened, by means of bolt 54, to the lower end of the power-driven shaft 48, and a pair of offset blades 56 swingably mounted on opposite outer ends of the carrier 52. The outer end portions 58 of the carrier 52 are bent downwardly along a diagonal line such that they have flat surfaces sloping downwardly and outwardly. The portions 58 also are inclined forwardly relative to the direction of the travel of the blade, the latter direction being indicated by the arrow in FIG. 1, between lower forward edges and upper trailing edges. Each of the swingable blades 56 includes inner and outer, parallel and vertically offset upper and lower end portions 60 and 62, respectively, the latter including a sharpened cutting edge 64, and a center portion 66 connecting the portions 60 and 62. The inner end portion 60 of the blade 56 is disposed parallel with the end portion 58 of the carrier 52 and is mounted adjacent to the lower surface thereof on a pivot bolt 68, the axis of the bolt 68 disposed perpendicular to the end portion 58.

Figure 2:
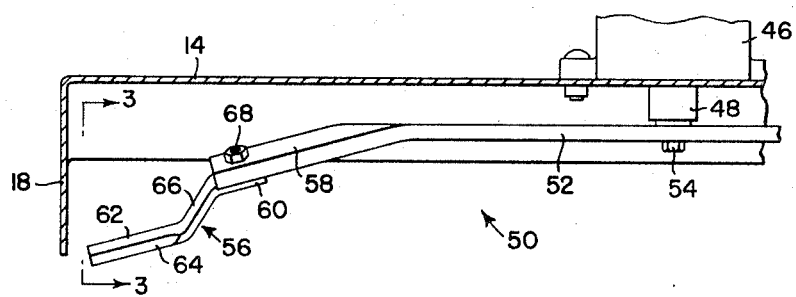
FIG. 2 is an enlarged sectional view of the mower taken generally along the line 2—2 of FIG. 1.
Figure 3:
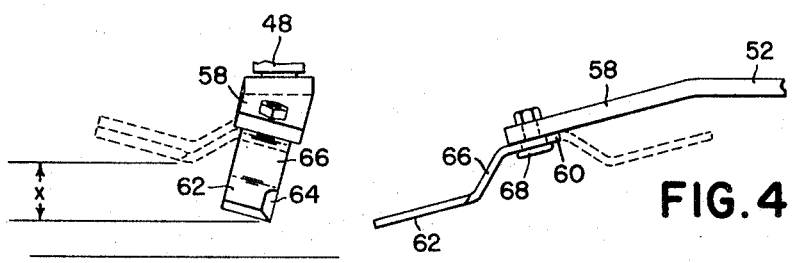
FIG. 3 is an elevation view taken generally along the line 3—3 of FIG. 2.
Figure 4:
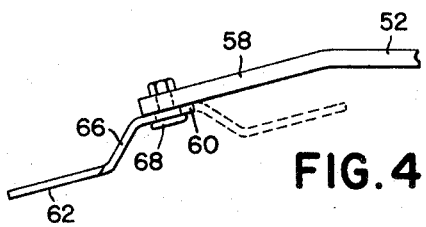
FIG. 4 is a view taken generally along the line 4—4 of FIG. 1.

In operation, centrifugal force normally maintains each of the blades 56 in a radially outwardly extending position, illustrated in FIG. 2, and in solid lines in FIGS. 3 and 4, with the cutting edge 64 lying in close proximity to the ground. Upon striking a rigid object, the blade is free to pivot rearwardly about the sloped axis of the bolt 68 to the position indicated with dashed lines in FIG. 3. Due to the forward and outward slope of the pivotal axis, the outer end portion 62 of the blade 56 moves upwardly the distance "X" as the blade swings from the former to the latter position. In the latter position, it will be noted that the lowest point on the blade 56 is substantially at the same level as the lowest point on the blade carrier 52, and due to the vertical offset of the blade 56, the carrier 52 can be mounted in close proximity to the top of the housing 12. Thus, as the blade 56 swings to the inoperative, rearwardly extending position indicated by the dashed lines of FIG. 3, the vertical clearance between the mower blade assembly and the ground is increased substantially, thereby permitting the mower to pass over stumps and similar obstructions without damage to the blade and drive train components. In addition, the downwardly and rearwardly inclined leading surface of the center portion 66 of the blade 56, shown clearly in dashed lines in FIG. 3, is effective to assist the outer end of the blade assembly over tall stumps and similar obstructions.

Since the outer end portion 62 of the blade 56 is, as previously mentioned, parallel with the inner end portion 60, which, in turn, is mounted parallel with the end portion 58 of the carrier 52, the portion 62 slopes upwardly and rearwardly from the upwardly and inwardly sloping cutting edge 64, when disposed in the normal operating position. It has been found that this particular orientation of the blade end portion 62 is effective to significantly reduce the tendency of the latter to discharge small rocks and other loose objects horizontally beneath the housing, an that instead, such objects are harmlessly deflected upwardly against the housing and eventually are discharged to the rear through the housing discharge outlet.

An additional feature of the invention is illustrated in FIG. 4. As shown therein, the configuration of the blade 56 and blade carrier 52, and the location of the pivot bolt 68 in the latter, are such that the blade 56 is free to swing through 360° without interfering with either the blade carrier 52 or the cover 14 of the mower housing 12.

What is claimed is:

1. For use in a rotary mower having a vertical, power-driven shaft, a mower blade assembly comprising: an elongated blade carrier adapted at its center to be nonrotatably secured to said shaft and having at least one angled end portion sloping downwardly, radially outwardly, and tangentially forwardly relative to the direction of rotation thereof; at least one blade having first and second, offset end portions, the second end portion having a cutting edge thereon; and means mounting the first end portion of said blade on the angled end portion of said blade carrier for swinging movement through 360° about an axis disposed substantially perpendicularly thereto, said blade being swingable between an operative position wherein the second end portion thereof is disposed radially outwardly of the first end portion and offset downwardly therefrom, and an inoperative position wherein the second end portion is disposed tangentially rearwardly of the first end portion and is raised from its operative position.

2. The invention defined in claim 1 wherein the first and second offset end portions of said blade are substantially parallel.

3. The invention defined in claim 2 wherein the first end portion of said blade is mounted substantially parallel with the angled end portion of said blade carrier, whereby the second end portion thereof is sloped downwardly, radially outwardly, and tangentially forwardly when said blade is in its operative position.

4. The invention defined in claim 1 wherein said blade includes a center portion sloping downwardly and rearwardly between the first and second end portions thereof when said blade is in its inoperative position, said center portion extending below the angled end portion of the blade carrier, whereby the blade is operative to deflect the blade carrier over obstructions when in its inoperative position.

5. The invention defined in claim 4 wherein the center portion of said blade extends below the first end portion thereof when said blade is in its operative position.

6. For use in a rotary mower having a vertical, power driven shaft, a mower blade assembly comprising: an elongated blade carrier adapted at its center to be nonrotatably secured to said shaft and having at least one angled end portion sloping downwardly, radially outwardly, and tangentially forwardly relative to the direction of rotation thereof; at least one blade having first and second offset end portions and a center portion interconnecting said end portions and extending at an angle relative to said end portions between adjacent edges thereof; and means mounting the first end portion of said blade on the underneath side of the angled end portion of said blade carrier for swinging movement through 360° about an axis disposed substantially perpendicular thereto, said blade being swingable between an operative position wherein the second end portion thereof is disposed radially outwardly from the first end portion and offset downwardly therefrom, and an inoperative position wherein the second end portion is disposed tangentially rearwardly from the first end portion and the center portion slopes downwardly and tangentially rearwardly from the rear edge of the first end portion to the front edge of the second end portion, the center portion of the blade extending below the angled end portion of the blade carrier when the former is in its inoperative position, whereby the blade is operative to deflect the blade carrier over obstructions when in its inoperative position.

* * * * *